March 17, 1964     J. J. SHARP     3,125,727
VOLTAGE AMPLITUDE DETECTION APPARATUS
Filed April 13, 1960
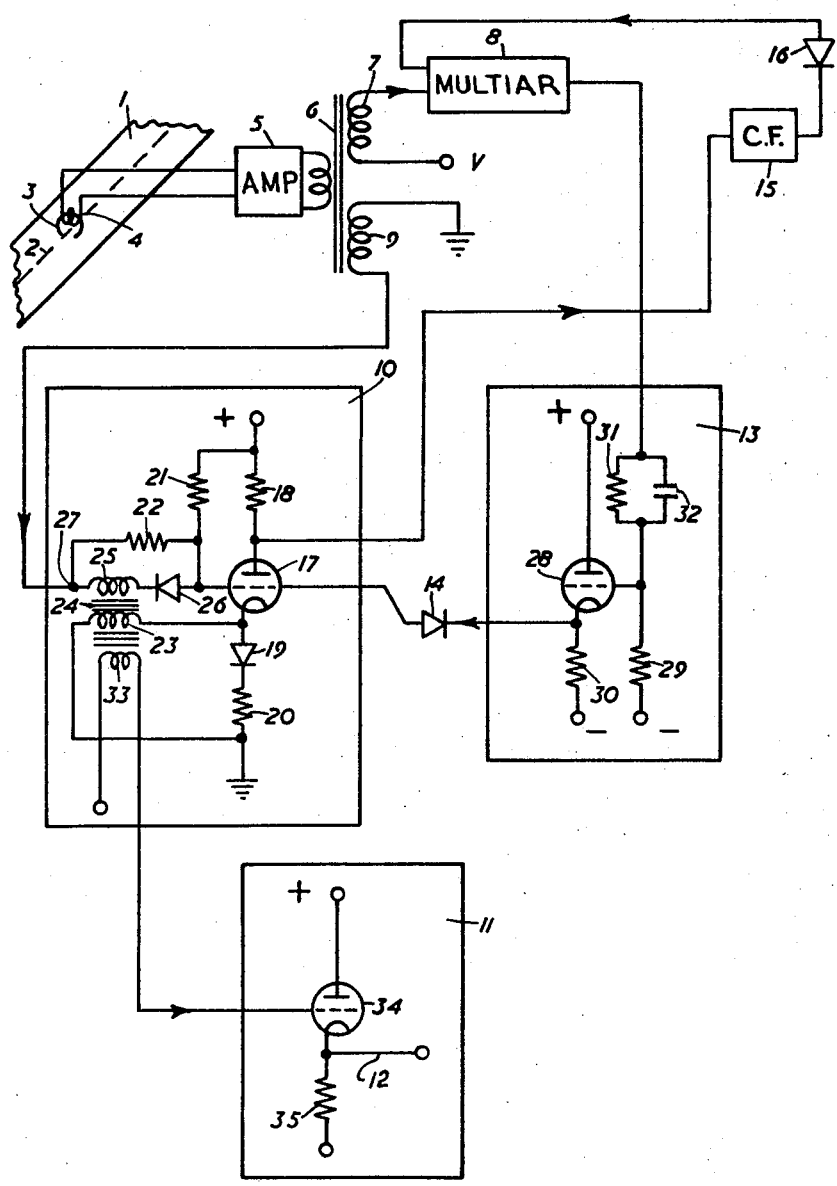
INVENTOR
JOHN JOSHUA SHARP
BY
ATTORNEY United States Patent Office 3,125,727
Patented Mar. 17, 1964

3,125,727
VOLTAGE AMPLITUDE DETECTION APPARATUS
John Joshua Sharp, Woodley, near Romsey, England, assignor to International Computers and Tabulators Limited, London, England
Filed Apr. 13, 1960, Ser. No. 21,993
Claims priority, application Great Britain Apr. 24, 1959
6 Claims. (Cl. 328—116)

This invention relates to voltage amplitude detection apparatus.

Voltage amplitude detection circuits which provide one voltage output when the input voltage is less than a reference voltage and a different output when the input voltage exceeds the reference voltage are well known. Various circuits of this kind are described, for example, in chapter 9 of volume 19 of the Radiation Laboratory Series, published by McGraw-Hill Book Company Inc. Such circuits always provide an output indication each time the input voltage exceeds the reference voltage.

It is an object of the invention to provide amplitude detection apparatus which will provide an output indication when the input voltage passes through a first reference voltage only if the input voltage has already passed through a second reference voltage.

It is another object of the invention to provide amplitude detection apparatus in which an input waveform is applied to two amplitude detection circuits, the two circuits being so interconnected that one of the circuits is responsive to the input waveform only if the other of the circuits has been operated.

According to the present invention voltage amplitude detection apparatus comprises first amplitude detection means normally maintained inoperative and arranged, when operative, to produce an output indication when an input signal passes through a first reference voltage and second amplitude detection means responsive to the input signal passing through a second reference voltage to render operative said first amplitude detection means whereby an output indication is produced only when the input signal passes through the second reference voltage prior to passing through the first reference voltage.

The invention will now be described, by way of example, with reference to the accompanying drawing, which is a schematic diagram of an amplitude detection arrangement for magnetic tape sensing equipment.

The drawing shows a magnetic tape 1 carrying a signal track 2, which is sensed by a magnetic head 3. Voltages induced in a head winding 4 are applied to a conventional multi-stage amplifier 5. The track 2 is recorded initially by passing the tape beneath a recording head through the winding of which is passed a normally continuous current sufficient to magnetise the tape to saturation in one direction. This conditon represents a binary zero. A binary one is recorded by momentarily reversing the current in the recording head to produce a small area of the track which is magnetically saturated in the opposite direction. The sensing of a recorded binary one by the head 3 induces in the winding 4 a voltage which is substantially one cycle of a sine wave. An amplitude detection circuit which provides an output whenever the input waveform exceeds a positive reference voltage can provide an output for each binary one. However, the input waveform is compared with a fixed reference voltage, so that the time in the cycle at which equality is reached is dependent upon the amplitude of the input waveform. This variability of timing is a disadvantage. It may be avoided by determining the time at which the input waveform crosses the zero axis, since this is substantially independent of the amplitude of the input waveform. This zero detection must be effective only when the zero crossing follows a positive half cycle, to avoid unwanted operation on random crossings due to noise signals when a binary one is not being sensed.

The output of the amplifier 5 is fed to the primary winding of a transformer 6. One end of a secondary winding 7 is connected to the input of a multiar amplitude detection circuit 8. The other end of the winding 7 is connected to a positive reference voltage V. One end of a further secondary winding 9 is connected to the input of a second multiar circuit 10. The other end of this winding is connected to ground, so that the multiar circuit 10 has zero reference voltage.

In the drawing the circuit of multiar 10 only is shown since it is substantially the same as that of multiar 8.

The circuits of cathode followers 13 and 15 are the same. The multiar circuit consists of a triode 17 of which the anode is connected to a positive supply through a resistor 18 and the cathode is connected to ground through a diode 19 and resistor 20 in series. The grid of triode 17 is connected in the case of multiar 10 by a diode 14 to the cathode of cathode follower 13. In the case of multiar 8, the grid is connected by diode 16 to cathode of cathode follower 15. The grid of triode 17 is also connected through resistor 21 to the positive supply.

The input signals from secondary winding 7 (or 9) are applied to the grid of triode 17 through a series resistor 22. In order to provide positive feedback, the primary winding 23 of a transformer 24 is connected between ground and the cathode of triode 17 and the secondary winding 25 is connected, in series with a diode 26, across the series resistor 22. The diode 26 is so connected that conduction therethrough only occurs when the grid is positive with respect to the point 27 between the secondary winding 25 and the secondary winding 7 (or 9). Thus it will be understood that when the diode 26 is non-conducting the positive feedback path is broken.

The cathode followers 13, 15 each consist of a triode 28 of which the anode is connected to the positive supply and the grid and cathode are connected respectively through resistors 29, 30 to negative supplies. As explained above, the cathode of triode 28 of cathode follower 13 is connected to the grid of triode 17 of multiar 10 through diode 14 and the cathode of cathode follower 15 is connected through diode 16 to the grid of multiar 8. The anode of multiar 8 is connected through parallel resistance 31 and condenser 32 to the grid of triode 28 of cathode follower 13. The anode of triode 17 of multiar 10 similarly is connected to the grid of cathode follower 15.

The circuit of multiar 10 differs from that of multiar 8 only in that a tertiary winding 33 is provided on the feedback transformer 24. One end of winding 33 is connected to a negative bias supply and the other end is connected to the grid of triode 34 of cathode follower 11. The anode of triode 34 is connected to the positive supply and the cathode is connected through a loud resistor 35 to a negative supply. An output line 12 is connected to the cathode of triode 34.

The bias potential applied to the cathode follower 15 is such that the triode of multiar 8 normally is conducting, and the bias applied to cathode follower 13 is such that when multiar 8 is conducting the grid of the triode of multiar 10 is held below cut off.

When a recorded binary one is sensed by the head 3 a voltage waveform consisting of substantially one cycle of a sine wave, with the negative half cycle leading is applied to the input of multiar 8. Since the end of winding 7 is connected to a positive potential V the diode 26 of multiar 8 normally is biased to prevent conduction. However when the negative portion of the input signal falls to such a level that the voltage at point 27, due to the combined effect of voltage V and input signal, is negative with respect to the grid of multiar 8, the diode 26 conducts and thereby closes the feedback path.

Thereafter a fall in grid potential is fed back from the cathode by the transformer 24 causing a rapid cut-off of the triode 17 of multiar 8. The anode potential of multiar 8 therefore rises causing the cathode potential of cathode follower 13 to rise and carry the grid potential of multiar 10 with it. Thus when the input potential passes through a level substantially equal to the reference voltage V, the multiar 8 is cut-off and the multiar 10 is rendered operative. The triode of multiar 10 thus conducts and its anode potential falls. This fall of anode potential is fed through cathode follower 15 to the grid of multiar 8, thereby preventing the grid of multiar 8 rising above cut-off.

The input signal is fed to the input of multiar 10 but is inverted with respect to that fed to multiar 8, that is to say the leading half cycle is positive. The diode 26 of multiar 10 is nonconductive whilst point 27 is positive with respect to the grid but when the input passes through zero potential the diode will be able to conduct causing feedback to occur. Thus when the zero cross-over occurs in the input waveform the triode of multiar 10 is cut-off rapidly and an output is produced across winding 33 which is fed to output line 12 through cathode follower 11. When cut off of the multiar 10 occurs, the anode potential of multiar 10 rises and by means of cathode follower 15 the multiar 8 is again rendered operative.

The output from multiar 8 is fed through the integrating circuit, consisting of resistance 31 and condenser 32, to ensure that the circuit 10 is still operative when the zero cross-over occurs in the input waveform.

An input waveform applied to multiar 8 in which the waveform first passes through the positive reference voltage V will thus cause operation of multiar 8 which in turn renders multiar 10 operative to produce an output pulse when the input passes through zero potential. However, if the input waveform does not pass through the positive reference voltage the multiar 10 will remain inoperative and no output will be produced as the waveform passes through zero potential.

The multiar form of amplitude detection circuit is preferred in the arrangement described because it provides relatively high accuracy and stability of operation. However, other types of amplitude detectors may also be employed. If necessary, the cathode followers 13 and 15 may be replaced by inverters to secure the correct polarity of the fed back voltage.

I claim:

1. Voltage amplitude detection apparatus including a source of input signals; sources of first and second fixed reference voltage levels; a first amplitude detection circuit connected to said input signal source and to said first reference voltage level source; a second amplitude detection circuit connected to said input signal source and to said second reference voltage level source; control means connected between said first and second amplitude detection circuits operable to render the detection circuits effective each in response to an output signal produced by the other, said control means initially being conditioned to render said first detection circuit effective to produce a first output signal when an input signal passes through said first reference voltage level, and said second amplitude detection circuit being rendered effective by said control means only after the occurrence of said first output signal to produce a second output signal when said input signal passes through said second reference voltage level; and means connected to said second amplitude detection circuit operative to produce a final output signal in response to the occurrence of said second output signal.

2. Voltage amplitude detection apparatus including a source of input signals; sources of first and second fixed reference voltage levels; a first amplitude detection circuit connected to said input signal source and to said first reference voltage level source; a second amplitude detection circuit connected to said input signal source and to said second reference voltage level source; control means connected between said first and second amplitude detection circuits operable to enable said amplitude detection circuits each in response to an output signal produced by the other and to disable that amplitude detection circuit producing the output signal, said control means initially being conditioned to enable said first amplitude detection circuit to produce a first output signal when an input signal passes through the first reference voltage level, said second amplitude detection circuit being enabled by said control means in response to the occurrence of said first output signal to produce a second output signal when said input signal passes through the second reference voltage level; and means connected to said second amplitude detection circuit operative to produce a final output signal in response to the occurrence of said second output signal.

3. Voltage amplitude detection apparatus including a source of input signals; a source of first reference voltage; a first multiar circuit; means connecting said first multiar circuit to said input signal source and to said first reference voltage source; a source of second reference voltage; a second multiar circuit; means connecting said second multiar circuit to said input signal source and to said second reference voltage source; control means connected between said first and second multiar circuits operable to enable said multiar circuits each in response to an output signal produced by the other and to disable that multiar circuit producing the output signal, said control means initially being conditioned to disable said second multiar circuit and to enable said first multiar circuit to produce a first output signal if an input signal passes through the first reference voltage, the control means being operated in response to said first output signal to disable said first multiar circuit and to enable said second multiar circuit to produce a second output signal if said input signal passes through the second reference voltage after the occurrence of the first output signal, said control means then being restored to its initial condition in response to said second output signal and means connected to said second multiar circuit operative to produce a final output signal in response to the occurrence of said second output signal.

4. Signal-detecting apparatus including a source of input signals each having first and second phases of opposite polarity; a source of first reference voltage of predetermined polarity; a first amplitude detection circuit connected to said source of first reference voltage; a first control device connected to said first amplitude detection circuit and initially conditioned to render said first amplitude detection circuit operable; means for applying input signals from the source to said first amplitude detection circuit such that the polarity of the first phase of a signal to be detected corresponds to the polarity of said first reference voltage, said first amplitude detection circuit being operative to produce a first output signal if an input signal passes through said first reference voltage; a source of second reference voltage; a second amplitude detection circuit connected to said source of second reference voltage; a second control device connected to said first and second amplitude detection circuits responsive to said first output signal to render said second amplitude detection circuit operable; means for applying said input signal to said second amplitude detection circuit; said second amplitude detection circuit then being operative to produce a second output signal if the input signal passes through said second reference voltage; and means connected to said second amplitude detection circuit responsive to said second output signal to produce a final output signal.

5. Signal-detecting apparatus including a source of input signals each having first and second phases of opposite polarity; a source of first reference voltage of predetermined polarity; a first amplitude detection circuit connected to said source of first reference voltage; a first control device connected to said first amplitude detection circuit and initially conditioned to energize said first amplitude detection circuit; means for applying input signals from the source to said first amplitude detection circuit such that the polarity of the first phase of a signal to be detected corresponds to the polarity of said first reference voltage, said first detection circuit being de-energized in response to the passage of an input signal through the first reference voltage to produce a first output signal; a source of second reference voltage; a second amplitude detection circuit connected to said source of second reference voltage; a second control device connected to said first and second amplitude detection circuits responsive to said first output signal to energize said second amplitude detection circuit; means for applying said input signal to said second amplitude detection circuit, said second amplitude detection circuit then being de-energized in response to the passage of said input signal through the second reference voltage to produce a second output signal; means connected to said second amplitude detection circuit responsive to said second output signal to produce a final output signal; and means interconnecting said second amplitude detection circuit and said first control device, said first control device being responsive to said second output signal to re-energize said first amplitude detection circuit.

6. Signal-detecting apparatus including a source of input signals each having first and second phases of opposite polarity; a source of first reference voltage of negative polarity; a first multiar circuit; first means connecting said first multiar circuit to said source of first reference voltage; a first control device connected to said first multiar circuit and initially conditioned to render said first multiar circuit conductive; means coupling said source of input signals to the first connecting means to apply input signals to said first multiar circuit, the sense of the coupling being such that input signals applied to the first multiar circuit are inverted to permit said first multiar circuit to respond to an input signal having a first phase of positive polarity, said first multiar being cut off in response to the passage of the input signal through the first reference voltage to produce a first output signal; a source of second reference voltage; a second multiar circuit; second means connecting said second multiar circuit to said source of second reference voltage; a second control device connected to said first and second multiar circuits responsive to said first output signal to render said second multiar circuit conductive; means coupling said source of input signals to the second connecting means to apply said input signal to said second multiar circuit, said second multiar circuit then being cut off in response to the passage of said input signal through the second reference voltage to produce a second output signal; means connected to said second multiar circuit responsive to said second output signal to produce a final output signal; and means interconnecting said second multiar circuit and said first control device, said first control device being responsive to said second output signal to again render said first multiar circuit conductive.

References Cited in the file of this patent
UNITED STATES PATENTS

| | | |
|---|---|---|
| 2,752,589 | De Long | June 26, 1956 |
| 2,819,396 | Russell | Jan. 7, 1958 |
| 2,834,883 | Lukoff | May 13, 1958 |
| 2,898,461 | Kernan | Aug. 4, 1959 |